United States Patent [19]
Ouchi et al.

[11] Patent Number: 5,739,763
[45] Date of Patent: Apr. 14, 1998

[54] METHOD FOR CONTROLLING ELECTRONIC APPLIANCE CAPABLE OF SUPPRESSING USER'S IRRITATION

[75] Inventors: Koji Ouchi, Kanagawa; Masaru Sato; Shigeo Tanaka, both of Tokyo, all of Japan

[73] Assignee: Sony Corporation, Tokyo, Japan

[21] Appl. No.: 369,272

[22] Filed: Jan. 5, 1995

Related U.S. Application Data

[63] Continuation of Ser. No. 5,842, Jan. 11, 1993, abandoned.

[30] Foreign Application Priority Data

Jan. 14, 1992 [JP] Japan .................... 4-024778

[51] Int. Cl.$^6$ .................................................. H04Q 19/02
[52] U.S. Cl. ................. 340/825.22; 340/825.69; 340/825.72; 340/825.24; 340/825.25; 348/734
[58] Field of Search .............. 340/825.69, 825.72, 340/825.24, 825.25; 348/734, 563, 564, 569, 589; 341/176; 359/148; 455/151.2, 151.4, 353

[56] References Cited

U.S. PATENT DOCUMENTS

| | | | |
|---|---|---|---|
| 4,279,035 | 7/1981 | Skerlos | 348/569 |
| 4,855,730 | 8/1989 | Venners et al. | 340/825.25 |
| 4,856,081 | 8/1989 | Smith | 348/734 |
| 4,928,168 | 5/1990 | Iwashita | 348/3 |
| 4,965,557 | 10/1990 | Schepers et al. | 348/734 |
| 4,996,597 | 2/1991 | Duffield | 455/135 |
| 5,097,249 | 3/1992 | Yamamoto | 455/353 |

Primary Examiner—Brian Zimmerman
Attorney, Agent, or Firm—Jay H. Maioli

[57] ABSTRACT

In an AV (audio and video) system, it is possible to suppress such a feeling of a user that he has to wait for an actual operation of an AV appliance after an operation instruction has been inputted until the AV appliance is actually operated. Upon receipt of a recording operation instruction of a VTR 3 issued from a remote controller 2, a CPU 12 first turns ON a power supply of the VTR 3. Thereafter, such a message indicating that the inputted instruction corresponds to the recording operation of the VTR 3 is displayed on a CRT 17. When a user inputs an instruction for confirming this message via a remote controller 2, the CPU 12 instructs the VTR 3 to start its recording operation.

2 Claims, 6 Drawing Sheets

METHOD FOR CONTROLLING ELECTRONIC APPLIANCE CAPABLE OF SUPPRESSING USER'S IRRITATION

This is a continuation of application Ser. No. 08/005,842 filed Jan. 11, 1993 now abandoned.

[BACKGROUND OF THE INVENTION]

1. [Field of the Invention]

The present invention generally relates to an electronic appliance controlling method. More specifically, the present invention is directed to a method for controlling an electronic appliance such as an audio/video unit employed in an AV system.

2. [Description of the Prior Art]

In an AV system, for instance, a VTR (video tape recorder), an LDP (laser disk player) and the like are connected to an AV center, a picture (video) signal may be reproduced from a predetermined recording medium, and also a signal may be recorded on a predetermined recording medium, if required.

In the conventional AV system, a control operation as defined in a flow chart shown in FIG. 1 is carried out. That is to say, for instance, when an instruction to perform a recording operation of the VTR is produced from a remote controller, a command to turn ON the power supply of the VTR is issued at a first step S1. At the next step S2, a confirmation is made as to whether or not the picture (video) signal line of this VTR and the sound (audio) signal line are connected in a correct manner. If these signal lines are under use by other electronic appliances, then the further process operation is interrupted since the picture signal cannot be recorded in the VTR.

At a step S3, to the contrary, when such a confirmation can be made that both the picture signal line and the sound signal line are not used by other electronic appliances, the process operation is advanced to a step S4 at which a command for connecting these signal lines to the VTR is issued. Further, at a step S5, an instruction to start the recording operation of the VTR is made. As a result, the recording operation of the VTR is commenced. Then, at the next step S6, the signals recorded on the VTR are displayed on a television receiver in the PIP (picture-in-picture) display mode. This condition is continued until it is judged at a step S7 that a command to stop the recording operation is produced. At this step S7, if a judgment is made that the completion of the recording operation by the VTR is instructed, then a recording stop command is outputted at a step S8. As a consequence, the recording operation of the VTR is stopped.

In accordance with the above-described conventional AV system, since the connection states of the signal lines and the like are confirmed after the instruction to perform such a recording operation has been inputted, a relatively long waiting time is required until the operations of the VTR are actually commenced. As a result, any operators may have irritation feelings with respect to such a long waiting time.

[SUMMARY OF THE INVENTION]

The present invention has been made in an attempt to solve the above-described problems, and has an object to provide an electronic appliance controlling method capable of improving operability and capable of not causing an operator to be irritated.

To achieve the above-described object, an electronic appliance controlling method is characterized in that a power supply of an electronic appliance is turned ON when an instruction related to an operation of the electronic appliance is input by a user, a confirmation message related to the operation of the electronic appliance is displayed when said power supply thereof is turned ON, and the operation of the electronic appliance corresponding to the instruction is commenced after a confirmation has been made with respect to the message.

In accordance with an electronic appliance controlling method this controlling method is characterized in that a connection condition of an electronic appliance is confirmed at a relatively short time period, the confirmed connection condition is stored in storage means, and the electronic appliance to be operated in accordance with the stored connection condition of the electronic appliance is operated when an instruction related to an operation of the electronic appliance is inputted.

An electronic appliance controlling method is characterized in that a message indicative of "under process" such as "WAITING" is displayed until an operation of an electronic appliance is commenced when an instruction related to the operation of the electronic appliance is inputted, and the display of the message is interrupted when the operation of the electronic appliance is commenced.

In accordance with the electronic appliance controlling method when the recording operation of the VTR is instructed, the command to turn ON the power supply of this VTR is first issued. Thereafter, the message used to confirm whether or not the recording operation by the VTR is executed, is displayed. When the user performs the operation corresponding to the content of this message, the recording operation by the VTR is commenced. As a consequence, it is possible to suppress such a feeling that the operator must wait for the actual recording operation by the VTR for a long time period.

Also, in accordance with the electronic appliance controlling method the connection conditions of the electronic appliances are continuously monitored at a relatively short time period, and the connection conditions are stored. Thus, when the command related to the operations of the electronic appliance is inputted, the connection conditions need not be newly confirmed. As a result, the electronic appliances can be quickly operated.

Moreover, in accordance with the electronic appliance controlling method the message of "WAITING" is displayed until the operations of the electronic appliances are started. Therefore, the user can confirm that the electronic appliances are under use, so that it is possible to suppress such a feeling that he must wait for the actual operations of these electronic appliances.

[BRIEF DESCRIPTION OF THE DRAWINGS]

For a better understanding of the present invention, reference is made of the following description in conjunction with the accompanying drawings, in which.

[DETAILED DESCRIPTION OF THE PREFERRED EMBODIMENTS]

Figure 1:
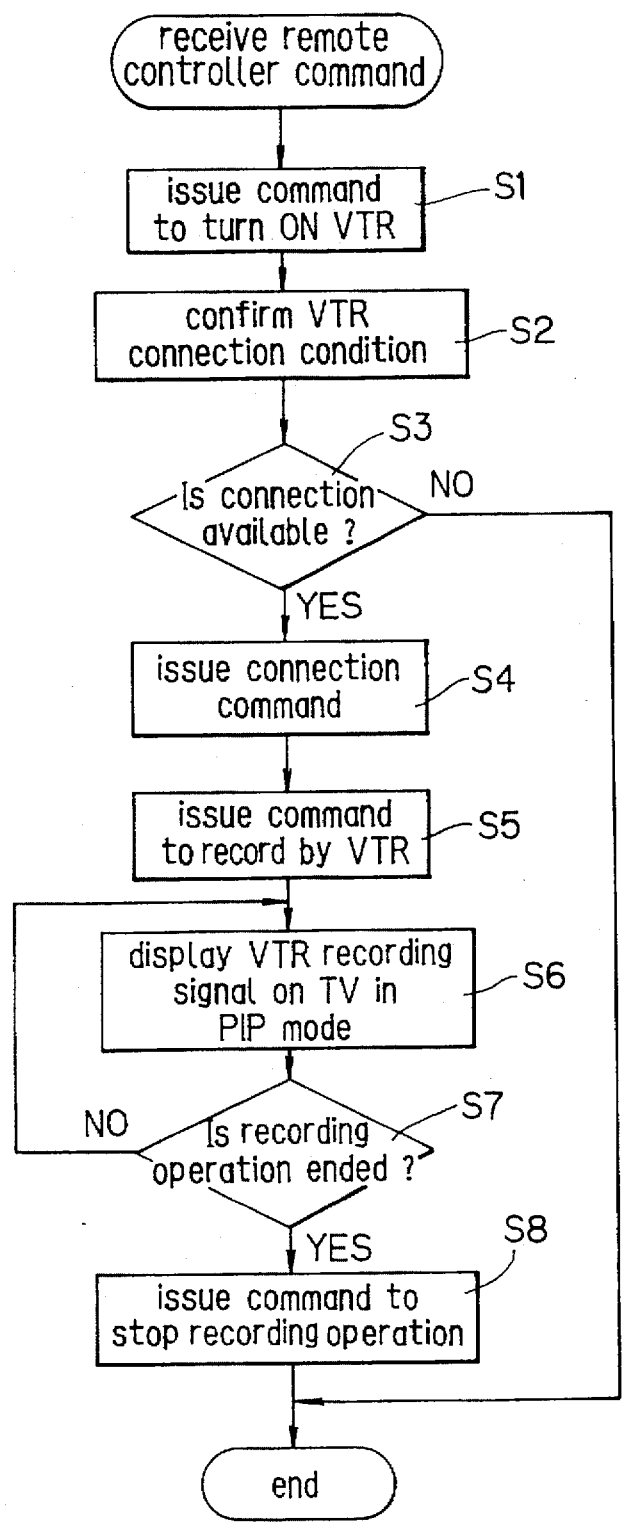
FIG. 1 is a flow chart for explaining operations of the conventional AV system.
Figure 2:
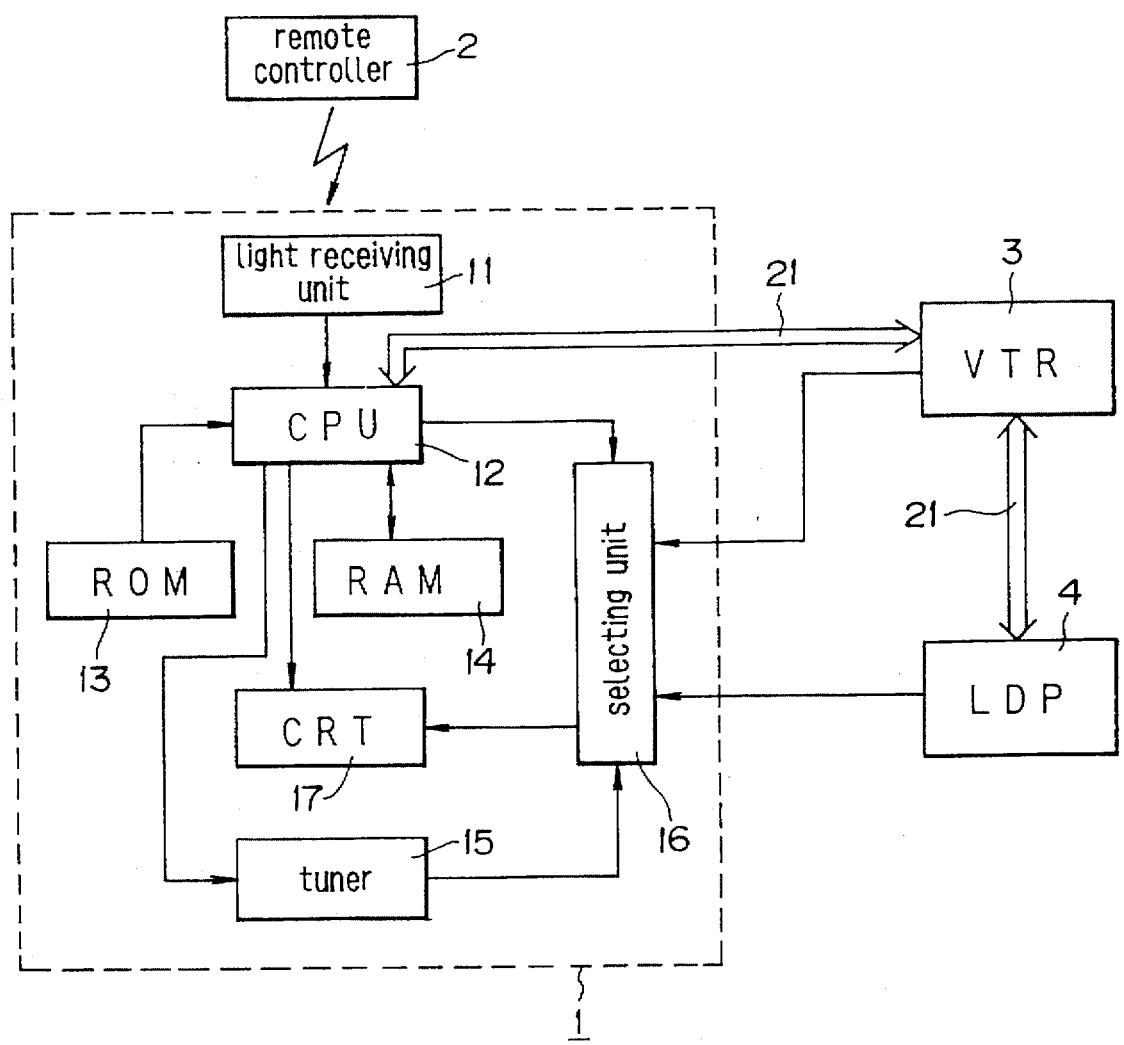
FIG. 2 is a schematic block diagram for showing an arrangement of an AV system to which a method for controlling an electronic appliance according to a preferred embodiment of the present invention has been applied.

FIG. 2 is a schematic block diagram for representing an arrangement of an AV (audio/video) system to which an electronic appliance controlling method according to a preferred embodiment of the present invention has been applied. In this preferred embodiment, an AV center 1 is cascade-connected via a bus 21 to a VTR (video tape recorder) 3 and an LDP (laser disk player) 4. The AV center 1 is so designed that a predetermined instruction or command is issued from this AV center 1 and outputted through the bus 21 to the VTR 3 and the LDP 4. It is so arranged that a predetermined instruction or command is inputted by a remote controller 2 to this AV center 1.

The AV center 1 includes a CPU (central processing unit) 12 for controlling operations of various appliances. This CPU 12 executes a necessary process in accordance with a program previously stored in a ROM (read-only memory) 13. A RAM (random access memory) 14 is used to store data required in execution of a process. A light receiving unit 11 receives infrared light emitted from the remote controller 2, and outputs the detection result of the infrared light to the CPU 12. To a selecting unit 16, outputs derived from a tuner 15, the VTR 3 and the LDP 4 are supplied. Thus, one of these outputs is selected by this selecting unit 16 and then outputted to a CRT (cathode-ray tube) 17.

Figure 3:
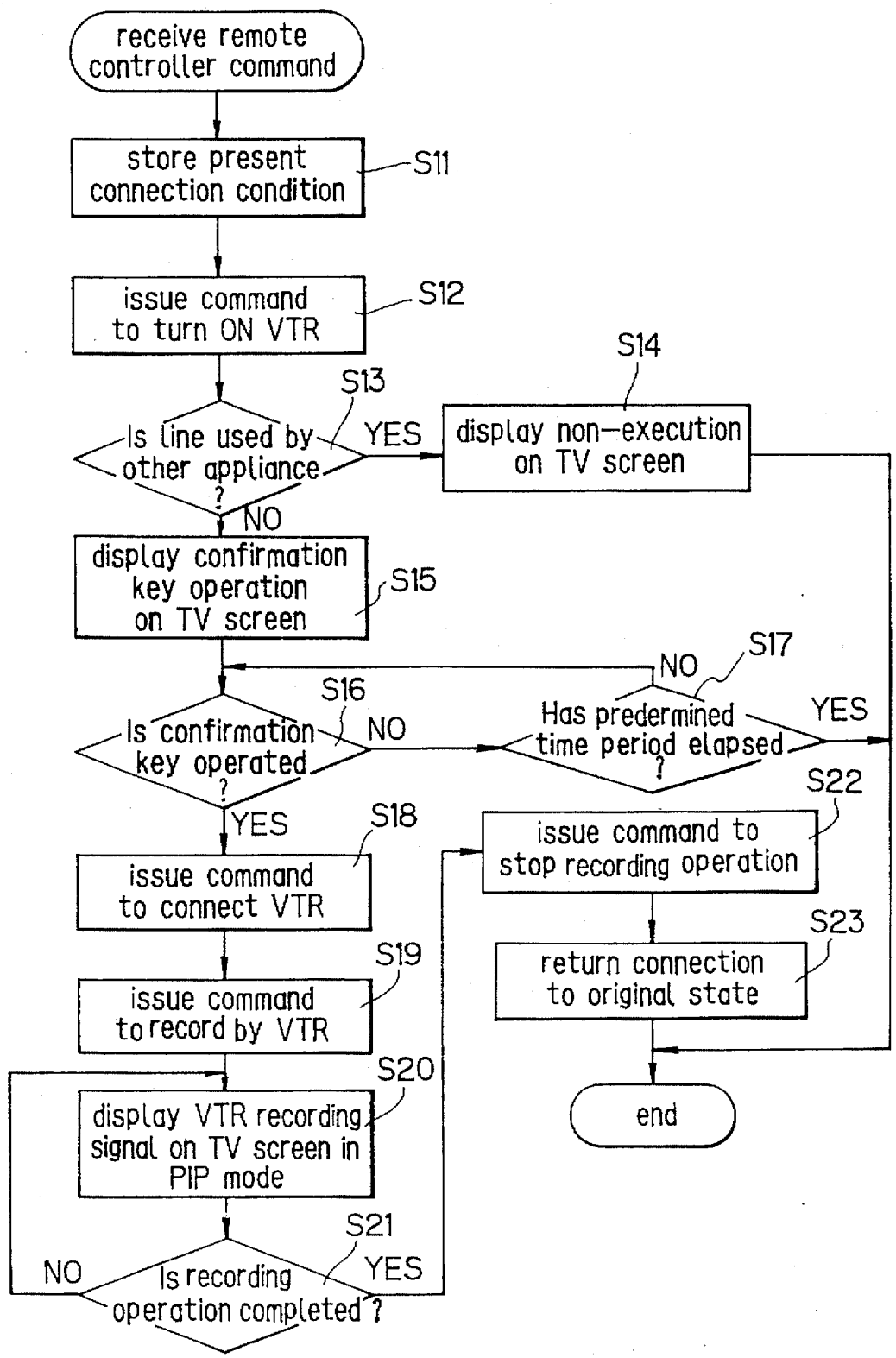
FIG. 3 is a flow chart for explaining a first operation of the AV system shown in FIG. 2.

Referring now to a flow chart shown in FIG. 3, an operation of the electronic appliance controlling method according to the preferred embodiment of the invention will be described. A process operation indicated in FIG. 2 is commenced when a predetermined remote control command (instruction) is supplied from the remote controller 2 via the light receiving unit 11 to the CPU 12. For the sake of simplicity, it is now assumed that an instruction to execute a recording operation by the VTR 3 has been entered.

At a first step S11, a present connection condition is stored in the RAM 14. That is to say, upon receipt of the instruction for the recording operation by the VTR 3 via the light receiving unit 11, the CPU 12 causes the connection condition of the selecting unit 16 just before the reception of this instruction to be stored into the RAM 14. For instance, in case that a signal outputted from the tuner 15 is supplied to be displayed on the CRT 17, the connection condition thereof is stored into the RAM 14. Then, the process operation is advanced to a step S12, where an instruction to turn ON the power supply of the VTR 3 is issued. This instruction is supplied from the CPU 12 via the bus 21 to the VTR 3. As a result, the power supply of this VTR 3 is turned ON.

At a step S13, a judgment is made whether or not both of a picture (video) signal line and a sound (audio) signal line which are connected to the VTR 3, are under use by other appliances at the selecting unit 16. For example, assuming now that the image outputted from the tuner 15 is represented by the CRT 17 and also the picture signal outputted from the LDP 4 is displayed in the PIP (picture-in-picture) mode on the CRT 17, if only one picture of this PIP mode is displayable, even when the image outputted from the VTR 3 is outputted to the CRT 17, the last-mentioned image cannot be monitored. Then, in such a case, the process operation is advanced to a step S14 at which such a fact that the instructed operation (namely, the recording operation by the VTR 3) cannot be executed, is displayed on the CRT 17.

When, for instance, the PIP channel is empty, the process operation is advanced to a step S15 at which the operation of the confirmation key is displayed. In other words, at this time, the CPU 12 causes the CRT 17 to display that the instruction entered by the remote controller 2 commences the recording operation of the VTR 3. Then, if a user judges that this instruction is correct, a message for requesting the remote controller 2 that any instruction is entered is displayed. At a step S16, a check is made as to whether or not the operation related to this message has been performed by the remote controller 2. If the operation of the confirmation key for the message is not performed by the remote controller 2, the process operation is advanced to a step S17 at which another check is made whether or not a predetermined time period has elapsed. When the confirmation key is manipulated during this preset time period, the process operation is advanced to a step S18 at which a connection instruction is outputted via the bus 21 to the VTR 3. At this time, a connection required for executing the recording operation is carried out. The CPU 12 controls the selecting unit 16 in such a manner that the picture signal supplied from the VTR 3 can be supplied to the CRT 17 at the same time.

At the next step S19, a recording instruction is outputted from the CPU 12 via the bus 21 to the VTR 3. As a consequence, the recording operation by the VTR 3 is commenced. At the subsequent step S20, the signal being recorded in the VTR 3 is displayed in the PIP display mode on the CRT 17. That is to say, the picture signal outputted from the VTR 3 is selected by the selecting unit 16, and then supplied to the CRT 17 to be displayed in the PIP display mode. Accordingly, in this case, the picture signal derived from the VTR 3 is displayed as a child screen with respect to a parent screen outputted from the tuner 15 in a superimposing mode.

The above-explained operations are continued until a judgment is made that a stop instruction for the recording operation is issued from the remote controller 2 at a step S21. At a step S21, when it is judged that an instruction to stop the recording operation is issued from the remote controller 2, the process operation is advanced to a step S22 at which a recording stop command is furnished to the VTR 3 via the bus 21 from the CPU 12. Consequently, the recording operation of the VTR 3 is stopped. Then, the process operation is further advanced to a step S23 at which the connections are returned to the original states. In other words, the selecting unit 16, the VTR 3 and the LDP 4 are controlled by the CPU 12 in such a manner that the connections are returned to the connection states stored in the RAM 14 at the step S11.

As previously described, in accordance with this preferred embodiment, for instance, when the instruction to operate the VTR 3 is issued, the power supply of the VTR 3 is turned ON before the instructed operation of the VTR 3 is commenced, and furthermore, the representation for confirming the instruction to the VTR 3 is made. Since after the confirmation operation to this representation is performed by the user, the commencement of the operation for the VTR 3 is commanded, and it is possible to suppress such a feeling that the operator has to wait for the commencement of the actual operation after he has instructed this operation.

Figure 4:
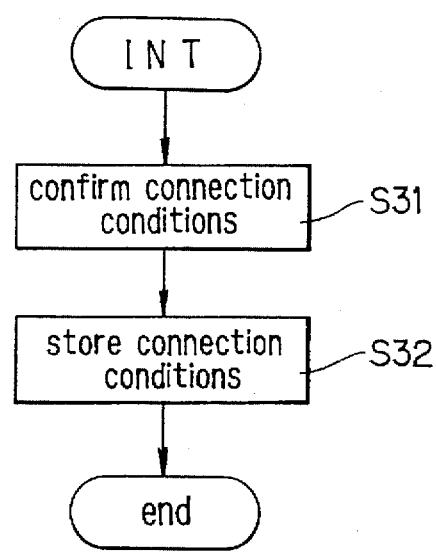
FIG. 4 is a flow chart for explaining a second operation of the AV system shown in FIG. 2.
Figure 5:
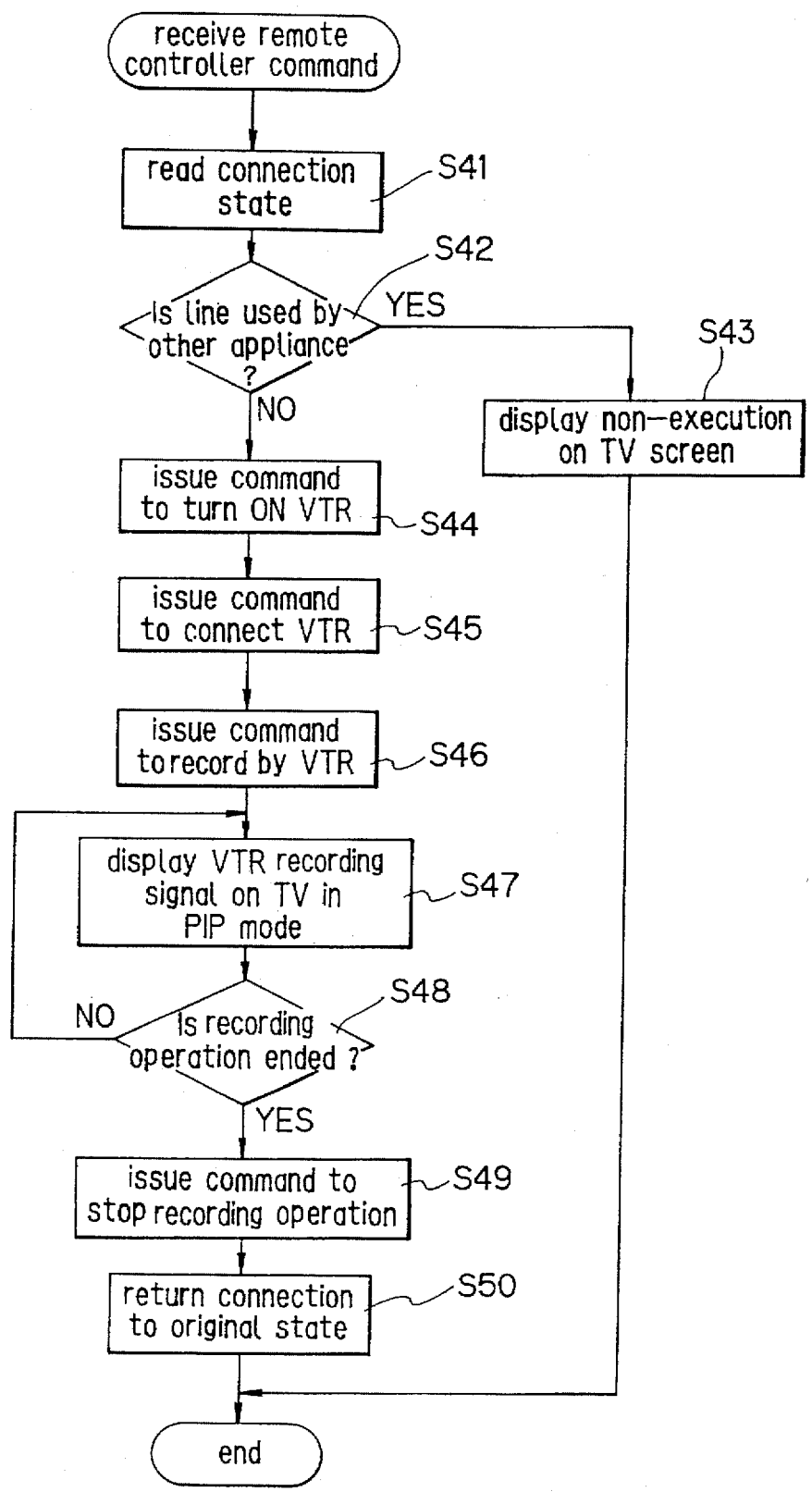
FIG. 5 is a flow chart for representing a process performed in relation to the flow chart of FIG. 4.

FIG. 4 and FIG. 5 are flow charts for showing a second control operation according to the present invention. In this second preferred embodiment, as shown in FIG. 4, the connection states of the respective electronic appliances are continuously and periodically monitored. The process as defined in FIG. 3 is executed by way of an interrupt process performed in a predetermined time period (e.g., every 1 second). At a first step S31, a confirmation is made of the connection conditions of the respective electronic appliances. Then, at the next step S32, the confirmed connection conditions are stored in the RAM 14. That is to say, the CPU 12 confirms the connection conditions of the VTR 3 and the LDP 4, and furthermore the selecting unit 16, and also causes the latest connection conditions to be stored in the RAM 14.

When a predetermined instruction is entered by the remote controller 2 under such a condition that the latest connection conditions have been stored in the RAM 14, a process operation as defined in FIG. 5 is carried out. At a step S41, the connection conditions stored in the RAM are read out therefrom. At a step S42, a judgment is made based on the read information whether or not the line required to execute the instruction inputted from the remote controller 2 is under use. If this required line is under use, then the process operation is advanced to a step S43 at which such a display that the inputted instruction cannot be executed is made on the CRT 17.

To the contrary, when the required line is not used by other electronic appliances, the process operation is advanced from the step S42 to a step S44 at which an instruction to turn ON the power supply of the VTR 3 is issued. Thereafter, the process operation is advanced to a step S45 at which a line connection required to perform the recording operation of the VTR 3 is outputted to the VTR 3. At the next step S46, a recording instruction is outputted to the VTR 3, so that the recording operation of the VTR 3 is commenced. The signal which has been recorded by the VTR 3 is displayed in the PIP display mode on the CRT 17 at a step S47. This operation is continued until it is judged at a step S48 that an instruction to stop the recording operation of the VTR 3 has been entered by the remote controller 2.

At this step S48, if such a judgment is made that the instruction to stop the recording operation is issued from the remote controller 2, the process operation is advanced to a step S49, at which an instruction to stop the recording operation is given to the VTR 3. As a consequence, the recording operation of the VTR 3 is stopped. Then, the process operation is advanced to a step S50 at which the connection conditions are returned to the original conditions.

In accordance with this preferred embodiment, since the connection conditions are periodically monitored at a relatively short time period and then are stored in the RAM, no confirmation is required for the connection conditions after the commencement of the operation has been instructed, and it is possible to shorten a time period defined from the operation start instruction to the actual operation commencement.

Figure 6:
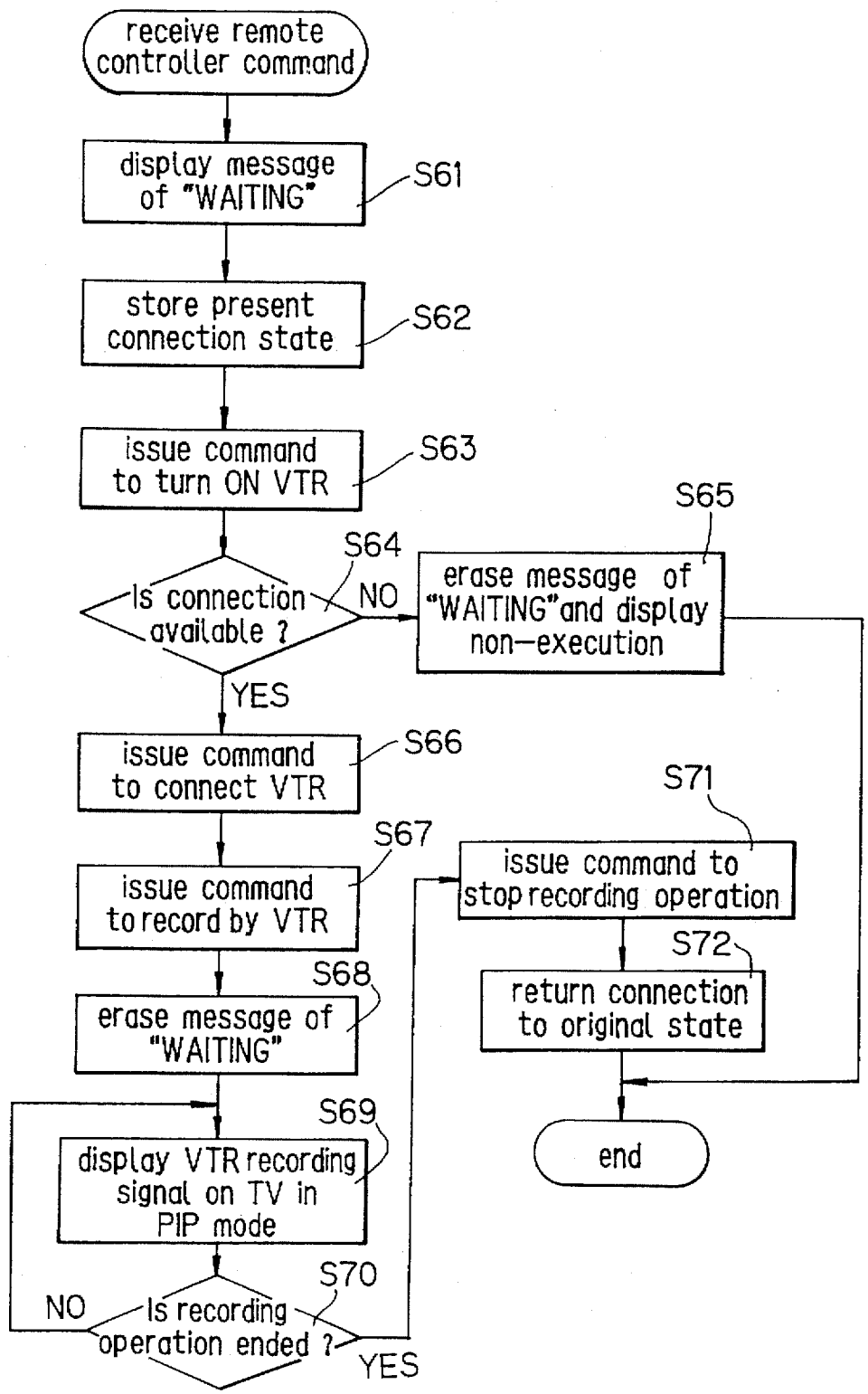
FIG. 6 is a flow chart for explaining a third operation of the AV system indicated in FIG. 2.

FIG. 6 represents a flow operation of another method for controlling an electronic appliance, according to a third preferred embodiment of the present invention. Similar to the above-described case, for instance, when a commencement of a recording operation of the VTR 3 is instructed from the remote controller 2 via the CPU 12, a message indicating that the operation is started is displayed on the CRT 17 at the first step S61 in this third preferred embodiment. In this preferred embodiment of the present invention, a character of "WAITING" is displayed on the CRT 17. The process operation is advanced to a step S62, the present connection conditions are stored in the RAM 14. At the next step S63, an instruction to turn ON the power supply of the VTR 3 is outputted.

At the subsequent step S64, a judgment is made as to whether or not the connection required for executing the recording operation of the VTR 3 can be used. If such a judgment result is obtained that the connection cannot be used, the process operation is advanced to a step S65 at which the character of "WAITING" which has been displayed at the previous step S61 is erased, and also another message indicating that the instructed operation cannot be executed is displayed instead of this "WAITING" character display.

At the step S64, if it is judged that the connection required for executing the recording operation by the VTR 3 is available, the process operation is advanced to a step S66 at which a connection instruction required to execute this recording operation is outputted. At the subsequent step S67, a recording instruction is outputted to the VTR 3. As a result, since the recording operation is commenced in the VTR 3, the character of "WAITING" is erased from the CRT 17 at a step S68. Then, to monitor a signal recorded in the VTR 3, this signal is outputted via the selecting unit 16 to the CRT 17 and then displayed thereon in the PIP mode.

At a step S70, a check is done as to whether or not an instruction to stop the recording operation is issued. If it is judged that such an instruction to stop the recording operation is issued, then the process operation is advanced to a step S71 at which a recording stop command is outputted to the VTR 3. Then, the process operation is further advanced to a step S72 at which the connection conditions are returned to the original connection conditions stored in the RAM 14 at the previous step S62.

In accordance with the third preferred embodiment, since when the operation instruction is inputted, the message indicating of "under process" (namely, character of "WAITING" in this preferred embodiment) is displayed in order to commence this instructed operation, the user can readily confirm that the process operation by the apparatus, or electronic appliance is under execution. As a consequence, it is possible to suppress such a feeling of the user that he has to wait for the actual process execution.

It should be noted that, for instance, even if a proper message would be displayed on the CRT 17 in the initial setting mode while confirming the addresses of the respective electronic appliances and the connections thereof, a similar advantage to that of the above-described preferred embodiment could be achieved. This proper message represents either which operation is being carried out, or what operation the user wishes to execute.

As previously described, in accordance with the electronic appliance controlling method, since when the instruction related to the operation of the electronic appliance is inputted, the message for requesting such an operation to confirm this instruction is displayed, it can be suppressed that the user has such a feeling that he must wait for the actual commencement of the operation of the electronic appliance.

Also, according to the electronic appliance controlling method, since the connection conditions of the electronic appliance are confirmed in a predetermined period and stored in the storage unit, the connection conditions are no longer required to be confirmed after the instruction related to the operation of the electronic appliance has been inputted, and also the time period until the operation of the electronic appliance is commenced can be shortened.

Furthermore, in accordance with the electronic appliance controlling method, since the message indicative of "under process" is displayed until the operation of the electronic appliance is commenced, it is possible to suppress such a feeling that the user waits for the actual operation of the electronic appliance.

What is claimed is:

1. A method for use in an audiovisual electronic appliance for controlling a plurality of audiovisual electronic apparatuses including a video tape recorder, wherein said audiovisual electronic appliance includes a CPU for controlling the operation of said plurality of audiovisual electronic apparatuses, temporary storage means for storing data during operation, and a selector for receiving audio and video outputs from said plurality of audiovisual electronic apparatuses, determining their operating status and routing a selected output to a CRT of said audiovisual electronic appliance, said method comprising the steps of:

receiving a user instruction relating to a record/playback operation of said video tape recorder;

storing information relating to an audio and video connection condition of said selector representing audio and video connections of said plurality of audiovisual electronic apparatuses by monitoring the audio and video signals flowing through said selector when said user instruction is received;

transmitting a first command generated by said CPU causing said video tape recorder to be turned ON;

determining based on said stored information whether said audio and video connection condition of said selector permits the operation of said video tape recorder in accordance with said user instruction;

permitting the user to confirm that said user instruction could be carried out when said audio and video connection condition of said selector is determined to permit the operation of said video tape recorder in accordance with said user instruction;

changing said audio and video connection condition of said selector to permit the operation of said video tape recorder in accordance with said user instruction;

transmitting a second command generated by said CPU causing said video tape recorder to be operated in accordance with said user instruction; and returning said selector of said audiovisual electronic appliance to said audio and video connection condition stored in the step of storing upon completion of the operation of said video tape recorder.

2. A method for use in an audiovisual electronic appliance for controlling a plurality of audiovisual electronic apparatuses including a video tape recorder, wherein said audiovisual electronic appliance includes a CPU for controlling the operation of said plurality of audiovisual electronic apparatuses, temporary storage means for storing data during operation, and a selector for receiving audio and video outputs from said plurality of audiovisual electronic apparatuses, determining their operating status and routing a selected output to a CRT of said audiovisual electronic appliance, said method comprising the steps of:

periodically confirming an audio and video connection condition of said selector representing audio and video connections of said plurality of audiovisual electronic apparatuses by monitoring the audio and video signals flowing through said selector at predetermined time intervals of one second or less;

storing said audio and video connection condition information obtained in said step of periodically confirming in said temporary storage means;

receiving a user instruction related to a record/playback operation of said video tape recorder;

reading out said audio and video connection condition information stored in said step of storing upon receiving said user instruction;

determining based on said read out information whether said audio and video connection condition of said selector permits the operation of said video tape recorder in accordance with said user instruction;

changing said audio and video connection condition of said selector to permit the operation of said video tape recorder in accordance with said user instruction when it is determined to be permitted in said step of determining;

causing said video tape recorder to be turned ON and operated in accordance with said user instruction; and returning said selector of said audiovisual electronic appliance to said audio and video connection condition stored in the step of storing upon completion of the operation of said video tape recorder.

* * * * *